(12) United States Patent
Law

(10) Patent No.: US 11,545,679 B2
(45) Date of Patent: Jan. 3, 2023

(54) FUEL CELL ARRANGEMENT HAVING A VORTEX TUBE, FUEL CELL SYSTEM AND VEHICLE HAVING A FUEL CELL ARRANGEMENT

(71) Applicant: Airbus Operations GmbH, Hamburg (DE)

(72) Inventor: Barnaby Law, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 55 days.

(21) Appl. No.: 16/752,010

(22) Filed: Jan. 24, 2020

(65) Prior Publication Data

US 2020/0243881 A1 Jul. 30, 2020

(30) Foreign Application Priority Data

Jan. 25, 2019 (DE) .................. 10 2019 101 884.6

(51) Int. Cl.
| | |
|---|---|
| *H01M 8/04* | (2016.01) |
| *H01M 8/04082* | (2016.01) |
| *H01M 8/04014* | (2016.01) |
| *H01M 8/04119* | (2016.01) |
| *H01M 8/04701* | (2016.01) |
| *H01M 8/04828* | (2016.01) |
| *H01M 8/0656* | (2016.01) |
| *H01M 16/00* | (2006.01) |

(52) U.S. Cl.
CPC ... *H01M 8/04201* (2013.01); *H01M 8/04014* (2013.01); *H01M 8/04164* (2013.01); *H01M 8/04708* (2013.01); *H01M 8/04835* (2013.01); *H01M 8/0656* (2013.01); *H01M 16/003* (2013.01); *H01M 2250/20* (2013.01)

(58) Field of Classification Search
None
See application file for complete search history.

(56) References Cited

U.S. PATENT DOCUMENTS

| 2013/0302706 A1 | 11/2013 | Olsommer |
| 2017/0279141 A1* | 9/2017 | Hotto ............... F02M 33/00 |
| 2018/0219267 A1 | 8/2018 | Martin et al. |

FOREIGN PATENT DOCUMENTS

| DE | 102018101684 A1 | 8/2018 |
| JP | 2001026401 A | 1/2001 |
| JP | 2007280794 A | 10/2007 |

(Continued)

OTHER PUBLICATIONS

English translation of DE102018101684A1 to Martin et al. (Year: 2018).*

(Continued)

*Primary Examiner* — Lucas J. O'Donnell
(74) *Attorney, Agent, or Firm* — Greer, Burns & Crain, Ltd.

(57) ABSTRACT

A fuel cell arrangement which comprises a fuel cell having a first inlet for a fuel and a second inlet for an oxidizing agent, and comprises a vortex tube having an inlet, a first outlet for heated gas and a second outlet for cooled gas. Here, the first outlet of the vortex tube is fluidically connected to the first inlet or the second inlet of the fuel cell. A fuel cell system may have such a fuel cell arrangement, and a vehicle may have such a fuel cell arrangement or fuel cell system.

8 Claims, 6 Drawing Sheets

(56) References Cited

FOREIGN PATENT DOCUMENTS

KR     1020090015273 A1     2/2009
KR     20180101828 A  *  9/2018

OTHER PUBLICATIONS

English Translation of KR20090015273A (Year: 2009).*
KR-20180101828-A English translation (Year: 2018).*
German Search Report; priority document.
European Search Report for corresponding European Patent Application No. 20152771.0 dated May 15, 2020.

* cited by examiner

FUEL CELL ARRANGEMENT HAVING A VORTEX TUBE, FUEL CELL SYSTEM AND VEHICLE HAVING A FUEL CELL ARRANGEMENT

CROSS-REFERENCES TO RELATED APPLICATIONS

This application claims the benefit of the German patent application No. 102019101884.6 filed on Jan. 25, 2019, the entire disclosures of which are incorporated herein by way of reference.

FIELD OF THE INVENTION

The invention relates to a fuel cell arrangement which has a fuel cell and a vortex tube. In particular the invention relates to a fuel cell arrangement in which the fuel or the oxidizing agent flows through a vortex tube, wherein the fuel or the oxidizing agent is divided into a heated fraction and a cooled fraction. The invention also relates to a fuel cell system having such a fuel cell arrangement, and to a vehicle having a fuel cell system or fuel cell arrangement.

BACKGROUND OF THE INVENTION

For the operation of a fuel cell, it is normally the case that fuel and/or an oxidizing agent are/is held in tanks and under elevated pressure. For the operation of the fuel cell, the fuel and/or the oxidizing agent are/is reduced to a pressure suitable for the fuel cell and are/is supplied to the fuel cell. Since fuel and oxidizing agent must always be present to a sufficient extent for the chemical reaction in the fuel cell, the fuel cell is supplied with more fuel and oxidizing agent than is necessary for the chemical reaction, so that, in a respective recirculation circuit, the fuel and the oxidizing agent are conducted back to the fuel cell.

SUMMARY OF THE INVENTION

The invention is based on an object of improving a fuel cell arrangement and, by way of simple means, designing the latter more efficiently.

According to one aspect, a fuel cell arrangement comprises a fuel cell, having a first inlet for a fuel and a second inlet for an oxidizing agent, and also comprises a vortex tube, having an inlet, a first outlet for heated gas and a second outlet for cooled gas. Here, the first outlet of the vortex tube is fluidically connected to the first inlet or the second inlet of the fuel cell.

The use of a vortex tube in the supply of the fuel or the oxidizing agent for the operation of the fuel cell makes it possible for the fuel or the oxidizing agent to be heated by simple means to the temperature required for the operation of the fuel cell. A vortex tube separates a gas, flowing into the inlet of the vortex tube, into a heated gas stream and a cooled gas stream, wherein the vortex tube may be of very simple construction. In this regard, in the simplest case, the separation of the gas streams may be realized by way of a vortex tube without moving parts (vortex tube with fixed geometry). In this way, the heating of the fuel or oxidizing agent for the fuel cell arrangement depends on a component of simple design, and therefore freedom from maintenance is involved, which makes continuous operation possible. Furthermore, due to the vortex tube, the pressure of the fuel or oxidizing agent can be set to the pressure necessary for the operation of the fuel cell. Therefore, in particular, if the fuel or oxidizing agent is held under elevated pressure (a pressure higher than the operating pressure in the fuel cell), freedom from maintenance is likewise possible by way of a vortex tube.

In one configuration variant, the fuel cell arrangement may furthermore comprise a first tank for the fuel and/or a second tank for the oxidizing agent. Here, the fuel is stored in the first tank, or the oxidizing agent is stored in the second tank, under elevated pressure, whereby the operation of the fuel cell over a predefined period of time is possible without the need for further fuel or oxidizing agent. Alternatively, the oxidizing agent may also be supplied to the fuel cell by way of a conveying device (for example a pump, compressor, fan, etc.) if storage in a separate tank is not necessary (as is the case in an environment with natural atmosphere). Consequently, the inlet of the vortex tube may be fluidically connected to the first tank or the second tank. In other words, the fuel or the oxidizing agent from the tank is conducted into the vortex tube and, via the first outlet of the vortex tube for heated gas, is conducted further into the fuel cell.

It goes without saying that the fuel cell arrangement may optionally also have a second vortex tube, the inlet of which is fluidically connected to the other tank (of the first and second tanks). In this way, a reduction in pressure and an increase in temperature of both gases (fuel and oxidizing agent) is possible via a respective vortex tube. It is also possible for use to be made of a vortex tube in the case in which the oxidizing agent is supplied without a tank but with a conveying device.

At any rate, the vortex tube, in a corresponding variant, may be designed such that, for example dimensioned such that, at the first outlet for heated gas, the fuel or the oxidizing agent flows out at the pressure and temperature optimal for the operation of the fuel cell. For example, the gas flowing out at the first outlet of the vortex tube may have a temperature of 30 to 70° C., preferably of 40 to 60° C., and particularly preferably of 50° C. Cooled gas (for example, cooled fuel or cooled oxidizing agent) flows from the second outlet of the vortex tube. The gas flowing out at the second outlet of the vortex tube may have for example a temperature of +10 to −30° C., preferably of 0 to −20° C., and particularly preferably of −10° C.

It is optionally possible for the dimensions of the vortex tube, or at least parts thereof, to be variably set. Thus, for example, at the inlet, at the first outlet and/or at the second outlet, provision may be made of a valve which makes the throughflow quantity, the throughflow cross section or the like, settable. It is also optionally possible for the length of the vortex tube to be settable, whereby pressure and temperature can be influenced. A change in length can be achieved, for example, by means of two tubes which are arranged concentrically and are displaceable with respect to one another or by a flexible tube or line.

In a further configuration variant, the fuel cell arrangement may furthermore comprise a heat exchanger which has a first inlet which is fluidically connected to the second outlet of the vortex tube, and has a second inlet for a fluid. Here, the heat exchanger may be designed such that it thermally couples the gas flowing in via the first inlet (and cooled by the vortex tube) with the fluid flowing in via the second inlet. In other words, the gas cooled by the vortex tube serves as a heat sink for the fluid flowing in via the second inlet of the heat exchanger.

In another configuration variant, the heat exchanger may have a first outlet from which the gas flowing in via the first inlet and thermally coupled with the fluid exits. Due to the thermal coupling with the fluid, the gas exiting/flowing out from the first outlet may have been heated by the fluid, that is to say has a higher temperature than at the first inlet of the heat exchanger. Furthermore, the first outlet of the heat exchanger may be fluidically connected to a line leading from the first outlet of the vortex tube to the fuel cell. In other words, the fuel or the oxidizing agent, after being cooled by the vortex tube and (if appropriate) subsequently heated in the heat exchanger, is supplied back to the fuel stream or oxidizing agent stream which has been heated by the vortex tube.

Optionally, the dimensions of the vortex tube, or at least parts thereof, may be fixedly or (by means of a valve and/or change in length) variably set such that the mixed fuel stream or oxidizing agent stream has a temperature which is optimal for the operation of the fuel cell. In this case, an average quantity of heat absorbed in the heat exchanger by the fuel or oxidizing agent may be assumed. Alternatively, it is possible for the absorbed quantity of heat to be measured and the vortex tube to be set accordingly. For this purpose, servo motors may be provided at one or more valves of the vortex tube and/or at other adjustment bodies of the vortex tube.

In one configuration variant, the second inlet of the heat exchanger may be fluidically connected to a first outlet of the fuel cell for surplus fuel. In other words, the surplus fuel exiting the fuel cell is cooled in the heat exchanger. Alternatively, the second inlet of the heat exchanger may be fluidically connected to a second outlet of the fuel cell for surplus oxidizing agent. Cooling of the surplus oxidizing agent can thus be achieved.

In yet a further configuration variant, the fuel cell arrangement may have a water separator which is designed to separate water off from the surplus fuel, or surplus oxidizing agent which flows in via the second inlet of the heat exchanger. Here, the water separator may be operated by way of the gas cooled by the vortex tube and flowing in via the first inlet of the heat exchanger (for example, may be cooled so as to condense water from the surplus fuel or oxidizing agent).

The fuel cell arrangement may furthermore comprise a water tank which is designed to collect water separated off by the water separator. The water thus collected may be re-used for further process sequences. For example, in a regenerative fuel cell arrangement, it is possible for the water to be separated back into fuel and oxidizing agent by means of electrolysis and used again in the fuel cell arrangement.

In another configuration variant, the second inlet of the heat exchanger may be fluidically connected to a cooling arrangement of the fuel cell. Since waste heat is generated during the production of electric current in the fuel cell, the fuel cell has to be cooled. For this purpose, a cooling arrangement, for example in the form of one or more heat exchangers, may be provided, wherein the cooling arrangement comprises a coolant which absorbs heat energy from the fuel cell. The heat energy absorbed by the cooling arrangement may be released in the heat exchanger of the fuel cell arrangement to the gas cooled by the vortex tube, that is to say, use the gas as a heat sink.

According to a further aspect, a regenerative fuel cell system comprises a fuel cell arrangement according to the first aspect or one of the configuration variants described. The fuel cell system furthermore comprises a water-collecting arrangement which is designed to collect the water accumulating during the production of energy (generation of electric current) in the fuel cell of the fuel cell arrangement. Since in most fuel cells hydrogen reacts with oxygen, water is accumulated during the production of energy in the fuel cell and has to be discharged. In a regenerative fuel cell system, the water is collected by way of the water-collecting arrangement so as to be re-used.

The fuel cell system may therefore furthermore comprise an electrolyzer which is designed to carry out, by means of electric current, electrolysis of the water collected by way of the water-collecting arrangement. For example, current produced or stored at another location may be supplied to the electrolyzer for the purpose of electrolysis operation. The hydrogen and oxygen produced by the electrolysis in the process may subsequently be supplied to the fuel cell arrangement. Alternatively or additionally, the hydrogen and oxygen produced may be stored, so as to be supplied as fuel or oxidizing agent to the fuel cell arrangement at a later time.

According to yet a further aspect, a vehicle comprises at least one fuel cell arrangement according to the first aspect. Alternatively or additionally, the vehicle may also comprise at least one regenerative fuel cell system according to the second aspect.

The vehicle may be a road vehicle, aircraft, spacecraft or a satellite. In particular, in the case of a satellite, provision may be made of a regenerative fuel cell system which generates regenerative current via solar cells in order to operate an electrolyzer. In this way, it is possible to provide a closed fuel cell system with a closed water circuit for an (almost) unlimited operating duration of the fuel cell arrangement.

It goes without saying that the above-described aspects, configurations and variants may be combined, without this being explicitly described. The present disclosure is consequently not limited to the individual configurations and configuration variants in the order described, or to a particular combination of the configuration variants.

BRIEF DESCRIPTION OF THE DRAWINGS

A preferred embodiment of the invention will now be discussed in more detail on the basis of the appended schematic drawing, wherein FIG. 1 schematically shows a regenerative fuel cell system, FIG. 2 schematically shows a longitudinal section through a vortex tube, FIG. 3 schematically shows a fuel cell arrangement with cooling of a recirculation gas, FIG. 4 schematically shows a further fuel cell arrangement with cooling of a recirculation gas, FIG. 5 schematically shows a further fuel cell arrangement with cooling of the fuel cell, and FIG. 6 schematically shows a vehicle with a fuel cell arrangement.

DETAILED DESCRIPTION OF THE PREFERRED EMBODIMENTS

Figure 1:
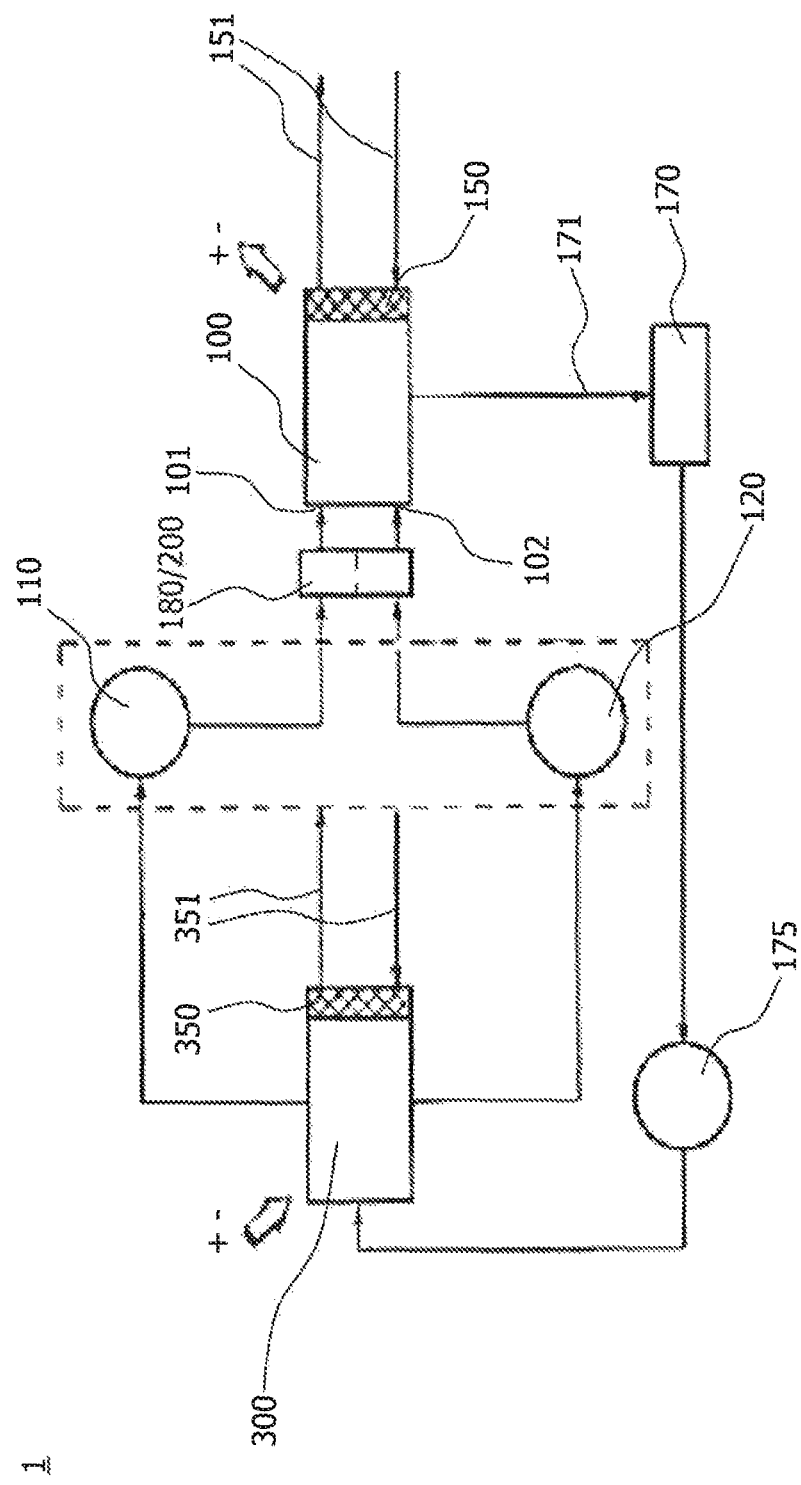

FIG. 1 schematically shows a regenerative fuel cell system 1. The fuel cell system 1 comprises a fuel cell 100 which is fed with fuel via a first inlet 101 and with oxidizing agent via a second inlet 102. As a result, the fuel cell 100 produces electricity (+−) at an anode and cathode (not illustrated) and also water which is discharged via a pump 170 through an associated line 171 into a collecting container 175. The waste heat generated during the operation of the fuel cell 100 is absorbed by a cooling device 150 and dissipated via a cooling circuit 151 to a heat sink (not separately illustrated).

The fuel may be stored in an associated tank 110. Correspondingly, the oxidizing agent may be stored in a tank 120. In a conventional fuel cell system 1, the fuel is normally supplied via a pressure regulator 180 to the first inlet 101 of the fuel cell 100. Also, the oxidizing agent may be supplied via a likewise optional pressure regulator 180 to the second inlet 102 of the fuel cell 100. Instead of the pressure regulator 180, use is made of a vortex tube 200 in the fuel cell system 1, as will be discussed in more detail.

In the regenerative fuel cell system 1, the water collected in the collecting container 175 is decomposed back into fuel (hydrogen) and oxidizing agent (oxygen) in an electrolyzer 300 and is conducted into the corresponding tanks 110 and 120, respectively. The electrolyzer 300 is supplied with electrical current so as to carry out the electrolysis. The current may originate, for example, from solar cells or some other energy source. Finally, the electrolyzer 300 is, via an associated cooling device 350, also cooled, the cooling device in turn being connected to a cooling circuit 351.

Figure 2:
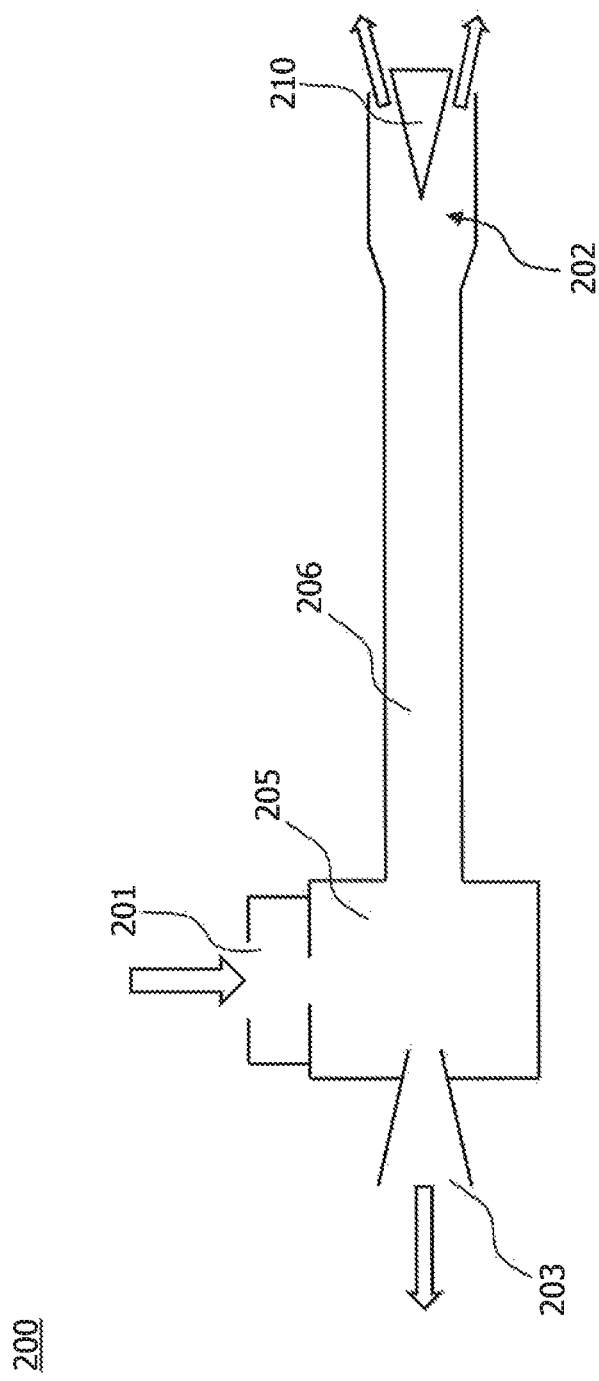

FIG. 2 schematically shows a longitudinal section through a vortex tube 200. The vortex tube 200 has an inlet 201 and two outlets 202 and 203. A gas flowing into the inlet 201 is diverted in a chamber 205 such that it assumes the form of a vortex flow which continues through the longitudinal tube 206 in the direction of the first outlet 202. At the first outlet 202, provision may be made of a valve 210 which can set a throughflow quantity of the gas through the first outlet 202.

In the vortex tube 200, in particular the longitudinal tube 206, hot gas is transported outwards (to the inner wall of the longitudinal tube 206), while cold gas prevails in the interior of the longitudinal tube 206. The cold gas, in the interior of the longitudinal tube 206, is conducted back into the chamber 205 and, there, conducted further to the second outlet 203. Here, temperature differences of the gas which exits at the first outlet 202 and which exits at the second outlet 203 of approximately 30 to 100K can occur. For example, a gas which is conducted at approximately 20° C. into the vortex tube 200 via the inlet 201 can exit at approximately 50° C. at the first outlet 202 and at approximately −10° C. at the (opposite) second outlet 203.

Figure 3:
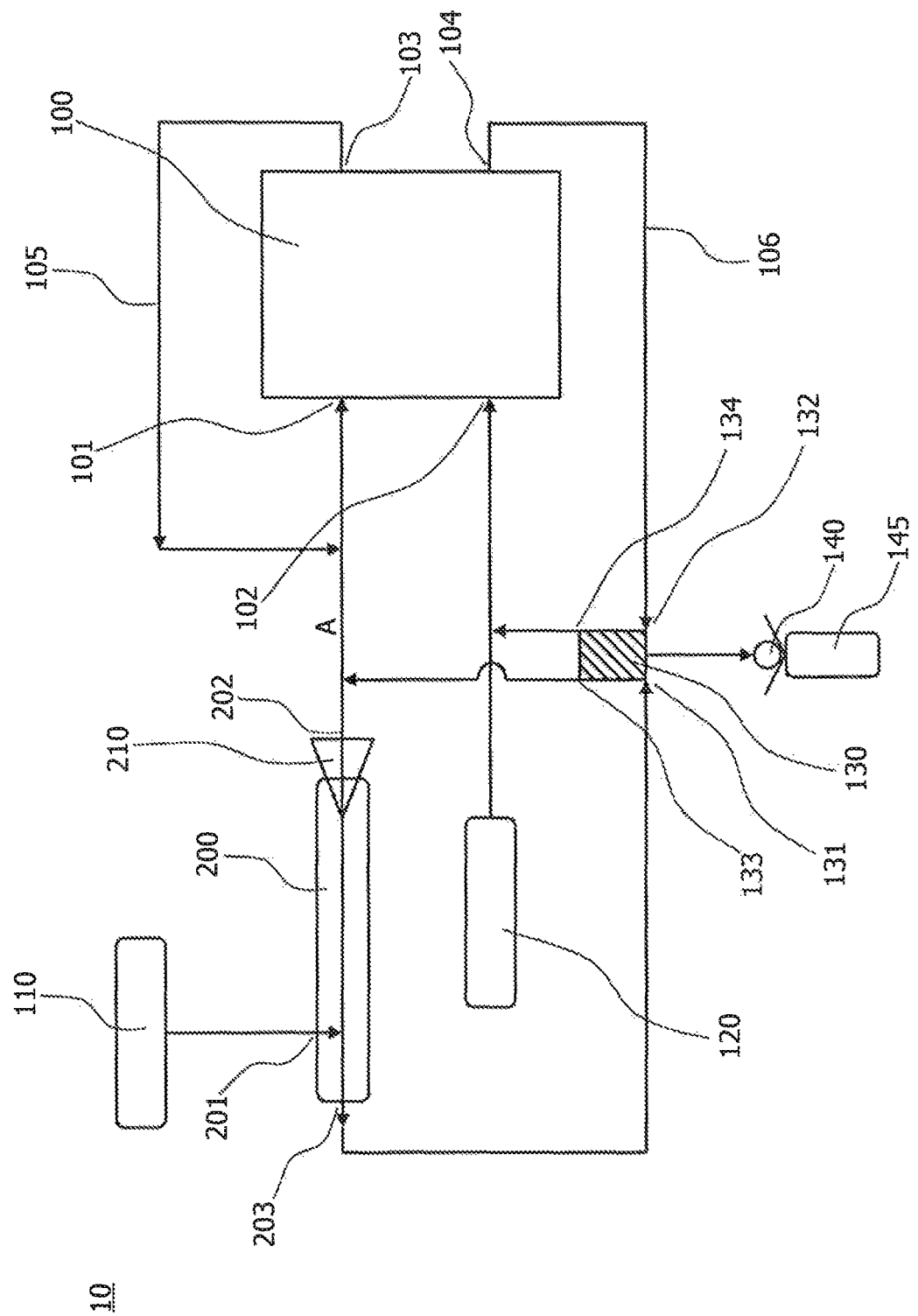

FIG. 3 schematically shows a fuel cell arrangement 10 with cooling of a recirculation gas. The fuel cell arrangement 10 comprises a fuel cell 100 which has a first inlet 101 for a fuel and has a second inlet 102 for an oxidizing agent. In the fuel cell arrangement 10, provision is furthermore made of a vortex tube 200 as described in FIG. 2. Here, the first outlet 202 of the vortex tube 200 is fluidically connected to the first inlet 101 of the fuel cell 100. A fluidic connection may be established, for example, by way of a tube or hose, which is suitable for the fuel and/or the oxidizing agent. In other words, gas heated by way of the vortex tube 200 is supplied to the first inlet 101 of the fuel cell 100.

For example, the gas supplied to the vortex tube 200 may be a fuel (such as, for example, hydrogen) of the fuel cell 100 that is stored under pressure in an associated first tank 110. The first tank 110 is fluidically connected to the inlet 201 of the vortex tube 200. Here too, the fluidic connection may be established by way of a suitable tube or hose. The vortex tube 200 thus divides the fuel stream into a heated gas stream which is conducted from the first outlet 202 of the vortex tube 200 to the first inlet 101 of the fuel cell 100, and a cooled gas stream which exits at the second outlet 203 of the vortex tube 200.

The fuel cell arrangement 10 furthermore has a heat exchanger 130 which has a first inlet 131 which is in turn fluidically connected (for example, by means of a tube or hose) to the second outlet 203 of the vortex tube 200. The heat exchanger 130 is designed such that it thermally couples the gas flowing in via the first inlet 131 with a fluid flowing in via a second inlet 132 of the heat exchanger 130. A thermal coupling allows a transfer of heat energy from the gas to the fluid, or vice versa, without the gas and the fluid being mixed.

In the fuel cell arrangement 10 illustrated in FIG. 3, the gas flowing in at the first inlet 131 of the heat exchanger 130, after the thermal coupling with the fluid, exits the heat exchanger 130 at a first outlet 133 of the heat exchanger 130. Here, the first outlet 133 of the heat exchanger 130 is fluidically coupled to the first inlet 101 of the fuel cell 100. For example, the gas flowing out at the first outlet 133 of the heat exchanger 130 may be introduced via a corresponding line (tube or hose) into a line which fluidically connects the first outlet 202 of the vortex tube 200 to the first inlet 101 of the fuel cell 100. In this way, the gas divided in the vortex tube into two differently temperature-controlled streams is brought back together, the temperature of the gas between the inlet 201 of the vortex tube and the line section A having increased. This is brought about, on the one hand, by the heating in the vortex tube 200 and, on the other hand, by a possible absorption of heat in the heat exchanger 130. For example, the temperature of the gas in the line section A may lie between 20 and 60° C., preferably between 30 and 50° C., and particularly preferably is 40° C.

The fuel supplied to the fuel cell 100 via the first inlet 101 may be supplied in a more than sufficient quantity, with surplus fuel being able to exit the fuel cell 100 again at a first outlet 103 of the fuel cell 100 (also referred to as anode outlet). Here, the first outlet 103 is fluidically connected to the first inlet 101 of the fuel cell 100. For example, provision may be made of a line 105 (tube or hose) which opens into a line which fluidically connects the first outlet 202 of the vortex tube 200 to the first inlet 101 of the fuel cell 100. In this way, fuel can be recirculated and supplied to the fuel cell 100 again. This also allows optimum temperature control of the fuel at the first inlet 101 of the fuel cell 100. For example, the fuel exits the fuel cell 100 at the first outlet 103 thereof at a temperature of approximately 50 to 90° C., preferably 60 to 80° C., and particularly preferably 70° C. The fuel temperature-controlled in this way is mixed with the fuel flowing in the line section A, whereby a temperature of the fuel at the first inlet 101 of the fuel cell 100 of approximately 40 to 80° C., preferably 50 to 70° C., and particularly preferably 60° C., is obtained.

The gas flowing between the first inlet 131 and the first outlet 133 of the heat exchanger 130 serves as a heat sink for any fluid to be cooled. The heat exchanger 130 may thus have a second inlet 132 and a second outlet 134, whereby a fluid can be conducted through the heat exchanger 130 and can release heat energy to the gas flowing through the heat exchanger 130. For example, the gas flowing out at the second outlet 203 of the vortex tube 200 may have a temperature of approximately +10 to −30° C., preferably of 0 to −20° C., and particularly preferably of −10° C. After absorbing heat energy in the heat exchanger 130, the gas may have a temperature of approximately 10 to 50° C., preferably 20 to 40° C., and particularly preferably of approximately 30° C., at the first outlet 133 of the heat exchanger 130.

The fuel cell 100 may furthermore have a second inlet 102 for an oxidizing agent and a second outlet 104 (also referred to as cathode outlet) for surplus oxidizing agent. The second outlet 104 of the fuel cell 100 may be fluidically connected to the second inlet 132 of the heat exchanger 130 such that the surplus oxidizing agent can be conducted via a corresponding line 106 (tube or hose) into the heat exchanger 130 and through the latter. Here, the oxidizing agent has a temperature at the second outlet 104 of the fuel cell 100 that corresponds to the temperature of the fuel at the first outlet 103 of the fuel cell 100. In the heat exchanger 130, the temperature of the oxidizing agent is reduced, for example to approximately 10 to 50° C., preferably 20 to 40° C., and particularly preferably 30° C. The oxidizing agent in the heat exchanger 130 can, at the second outlet 134, thus have the same temperature as the gas flowing out at the first outlet 133 of the heat exchanger 130.

Furthermore, owing to the cooling of the oxidizing agent, water may be separated off by a water separator 140 in the heat exchanger 130. In FIG. 3, the water separator 140 is illustrated separate from the heat exchanger 130, but may be integrated into the heat exchanger 130. The water separated off from the oxidizing agent may be collected in a collecting container 145. The water situated in the collecting container 145 may be either disposed of or re-used in a regenerative system (see FIG. 1).

Finally, it is also possible for the oxidizing agent to be recirculated, that is to say, to be supplied back to the fuel cell 100. In FIG. 3, the second outlet 134 of the heat exchanger 130 is fluidically connected to the second inlet 102 of the fuel cell 100. The oxidizing agent from the line 106 that is dried by the water separator 140 and heat exchanger 130 can thus be supplied back to the fuel cell 100. For example, a line connected to the second outlet 134 of the heat exchanger 130 may open into a line which fluidically connects an oxidizing agent tank 120 to the second inlet 102 of the fuel cell 100.

Figure 4:
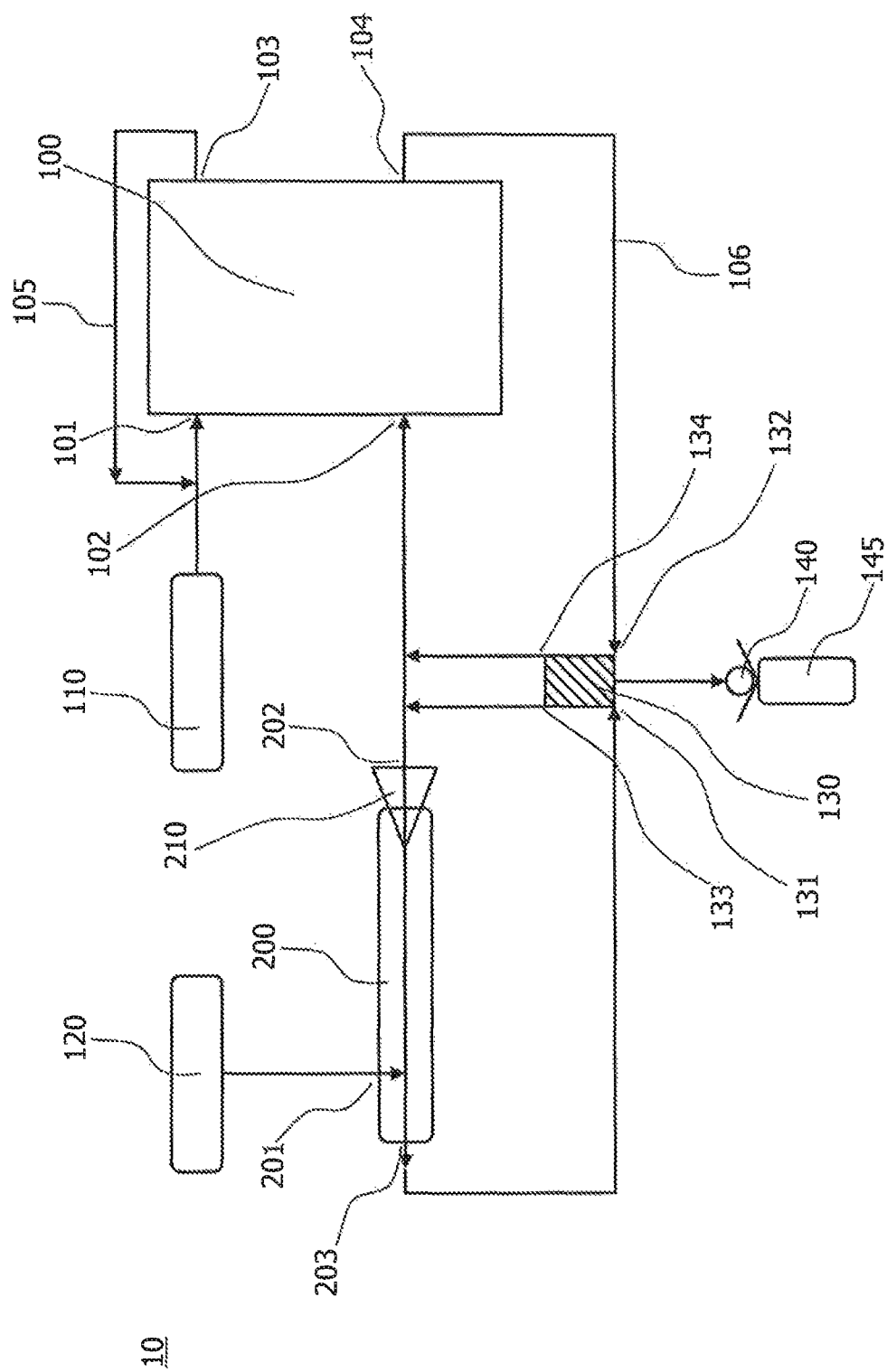

FIG. 4 schematically shows a further fuel cell arrangement 10 with cooling of a recirculation gas. In this case, the recirculation gas may be recirculated oxidizing agent (as shown in the fuel cell arrangement 10 from FIG. 3 and FIG. 4). Alternatively, it is also possible for recirculated fuel to be cooled, and optionally dehumidified, in the heat exchanger 130.

Since most of the components are the same and also functionally identical in the two fuel cell arrangements 10 shown in FIGS. 3 and 4, only the differences between FIGS. 3 and 4 are discussed in more detail. In this regard, the inlet 201 of the vortex tube 200 is fluidically connected to the tank 120 for the oxidizing agent, after which the oxidizing agent in the vortex tube 200 is divided into an oxidizing agent stream which is heated (at the first outlet 202) and an oxidizing agent stream which is cooled (at the second outlet 203). The first outlet 202 of the vortex tube 200 is fluidically coupled to the second inlet 102 of the fuel cell 100. Furthermore, both the first outlet 133 and the second outlet 134 of the heat exchanger 130 are fluidically coupled to the second inlet 102 of the fuel cell 100. For example, respective lines connected to the first and second outlets 133, 134 of the heat exchanger 130 open into a line which fluidically connects the first outlet 202 of the vortex tube 200 to the second inlet 102 of the fuel cell 100.

The recirculated fuel from tank 110 is neither cooled nor dehumidified. Consequently, the tank 110 is fluidically connected merely to the first inlet 101 of the fuel cell 100, while the first outlet 103 of the fuel cell 100 is likewise fluidically connected to the first inlet 101 of the fuel cell 100 (for example, by way of an opening into a line connecting the tank 110 and the fuel cell 100).

Figure 5:
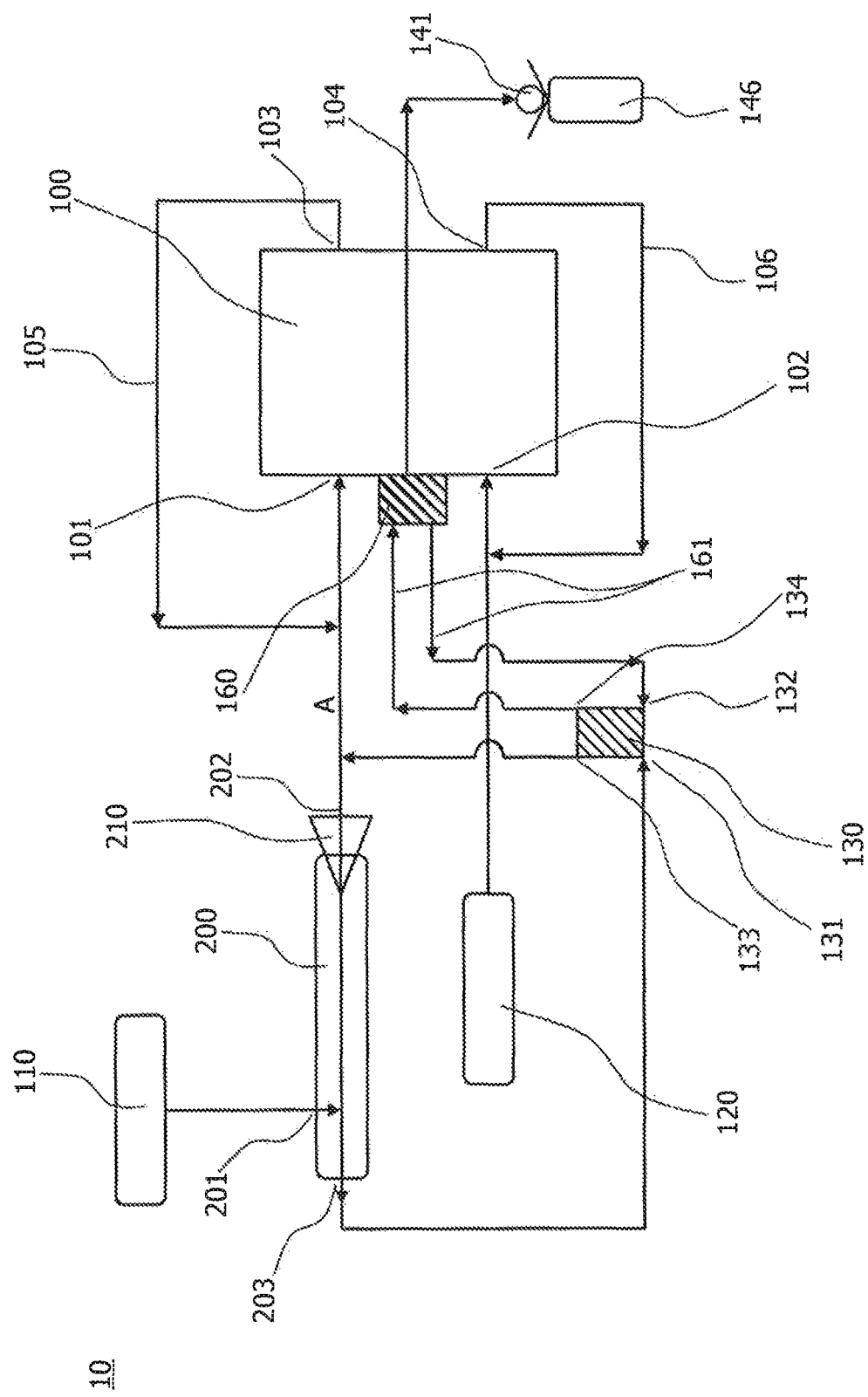

FIG. 5 schematically shows a further fuel cell arrangement 10 with cooling of the fuel cell 100. Here too, only differences in relation to the fuel cell arrangement 10 from FIG. 3 are discussed in more detail. By contrast to the fuel cell arrangement 10 from FIG. 3, the oxidizing agent from the tank 120 is directly recirculated, without being cooled and/or dehumidified in the heat exchanger 130. Instead, a cooling arrangement 160 is provided on or in the fuel cell 100. The cooling arrangement 160 is connected to a coolant-conducting cooling system 161. The coolant in the cooling system 161 is cooled in the heat exchanger 130 and supplied back to the cooling arrangement 160. Here, the coolant in the cooling system 161 may circulate between the cooling arrangement 160 and the heat exchanger 130 by way of a conveying device (not illustrated).

Fuel from the tank 110 that is cooled by means of the vortex tube 200 serves here as a heat sink (as in FIG. 3). Furthermore, provision may be made of a water separator 141 which, with the aid of the cooling arrangement 160, condenses and separates off water which forms in the fuel cell 100. The water may be collected in an associated collecting container 146.

Alternatively, it also possible for oxidizing agent from the tank 120 that is cooled by means of the vortex tube 200 to be used as a heat sink in the heat exchanger 130. For this purpose, the arrangement 10 in FIG. 5 is to be modified only in that the tanks 110 and 120, or the fuel and oxidizing agent stored therein, are swapped around.

It goes without saying that the fuel cell arrangements 10 which are illustrated in FIGS. 3 to 5 and have been described may be modified or combined with one another in any desired manner. In this regard, the heat exchanger 130 may be used not only for cooling and dehumidifying the fuel or the oxidizing agent or a coolant. Rather, the heat exchanger 130 may be used also for cooling and dehumidifying the fuel and the oxidizing agent, or the fuel and the coolant, or the oxidizing agent and the coolant (this list not being understood to be exhaustive). For example, use may be made of more than one vortex tube 200 so as to cool, and to use as a heat sink, different gases. It is also possible for use to be made of a single heat exchanger 130 for cooling multiple fluids (gases), for example through the provision of multiple thermally coupled fluid lines through the heat exchanger 130.

Furthermore, use may be made of each of the fuel cell arrangements 10 which are illustrated in FIGS. 3 to 5 and have been described, and further modifications thereof, in a fuel cell system 1 as is shown, for example, in FIG. 1. In this regard, the cooling arrangement 160 (FIG. 5) may correspond to the cooling arrangement 150 (FIG. 1) or be integrated into the latter. The same applies to the cooling systems 151 (FIG. 1) and 161 (FIG. 5) and to the water-collecting arrangement 170, 171, 175 (FIG. 1) and water separator 141 with water-collecting container 146.

Here, all of the water separated off may be re-used in the regenerative fuel cell system 1 from FIG. 1 and split back into fuel and oxidizing agent by the electrolyzer 300.

Figure 6:
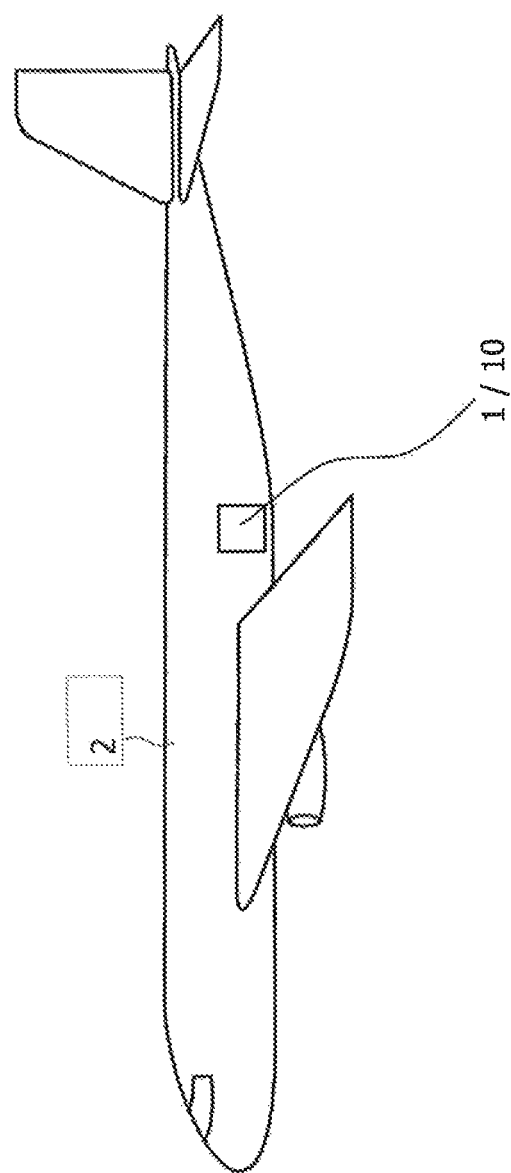

Finally, FIG. 6 schematically shows a vehicle 2 with a fuel cell arrangement 10. Although an aircraft is illustrated as the vehicle 2, it goes without saying that the vehicle 2 may also be a road vehicle, rail vehicle, spacecraft or satellite. In each vehicle and, in particular, in a satellite, an electrolyzer 300 can be operated with solar cells, so as to produce fuel and oxidizing agent in a regenerative fuel cell system 1.

The configurations described in FIGS. 1 to 6 are not intended to limit the present invention. Rather, the configurations serve merely for the understanding of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuel cell arrangement comprising:
    a fuel cell which has a first inlet for a fuel and a second inlet for an oxidizing agent and comprising:
        a vortex tube which has an inlet, a first outlet for heated gas and a second outlet for cooled gas, wherein the first outlet of the vortex tube is fluidically connected to the first inlet to supply a heated gas to the fuel cell;
        a first tank for the fuel, wherein the inlet of the vortex tube is fluidically connected to the first tank; and
        a heat exchanger which has a first inlet which is fluidically connected to the second outlet of the vortex tube, and has a second inlet for a fluid,
    wherein the heat exchanger is configured such that it thermally couples the gas flowing in via the first inlet with the fluid flowing in via the second inlet, and
    wherein the heated gas supplied to the fuel cell from the first outlet of the vortex tube bypasses the heat exchanger.

2. The fuel cell arrangement according to claim 1, furthermore comprising:
    a second tank for the oxidizing agent,
    wherein the inlet of the vortex tube is fluidically connected to the second tank, and wherein the second outlet of the vortex tube is fluidly connected to the second inlet of the fuel cell.

3. The fuel cell arrangement according to claim 1, wherein the heat exchanger has a first outlet from which the gas flowing in via the first inlet and thermally coupled with the fluid exits in a heated state, and wherein the first outlet of the heat exchanger is fluidically connected to a line leading from the first outlet of the vortex tube to the fuel cell.

4. The fuel cell arrangement according to claim 1, wherein the second inlet of the heat exchanger is fluidically connected to a first outlet of the fuel cell for surplus fuel or to a second outlet of the fuel cell for surplus oxidizing agent.

5. The fuel cell arrangement according to claim 4, furthermore comprising:
    a water separator which is configured to separate water off from the surplus fuel, or surplus oxidizing agent which flows in via the second inlet of the heat exchanger; and
    a water tank which is designed to collect water separated off by the water separator.

6. The fuel cell arrangement according to claim 1, wherein the second inlet of the heat exchanger is fluidically connected to a cooling arrangement of the fuel cell.

7. A vehicle having at least one fuel cell arrangement according to claim 1.

8. A fuel cell arrangement comprising:
    a fuel cell which has a first inlet for a fuel and a second inlet for an oxidizing agent and comprising:
        a vortex tube comprising a vortex tube inlet, a cold side outlet, and a hot side outlet, the hot side outlet for heated gas and the cold side outlet for cooled gas, wherein the hot side outlet of the vortex tube is fluidically connected to the first inlet of the fuel cell to supply a heated gas to the fuel cell;
        a first tank for the fuel, wherein the vortex tube inlet is fluidically connected to the first tank; and
        a heat exchanger which has a first inlet which is fluidically connected to the cold side outlet of the vortex tube, and has a second inlet for a fluid,
    wherein the heat exchanger is configured such that it thermally couples the gas flowing in via the first inlet with the fluid flowing in via the second inlet, and
    wherein the heated gas supplied to the fuel cell from the hot side outlet of the vortex tube bypasses the heat exchanger.

* * * * *